June 11, 1963 W. STELZER 3,093,119
FLUID PRESSURE MOTOR
Filed Oct. 30, 1961
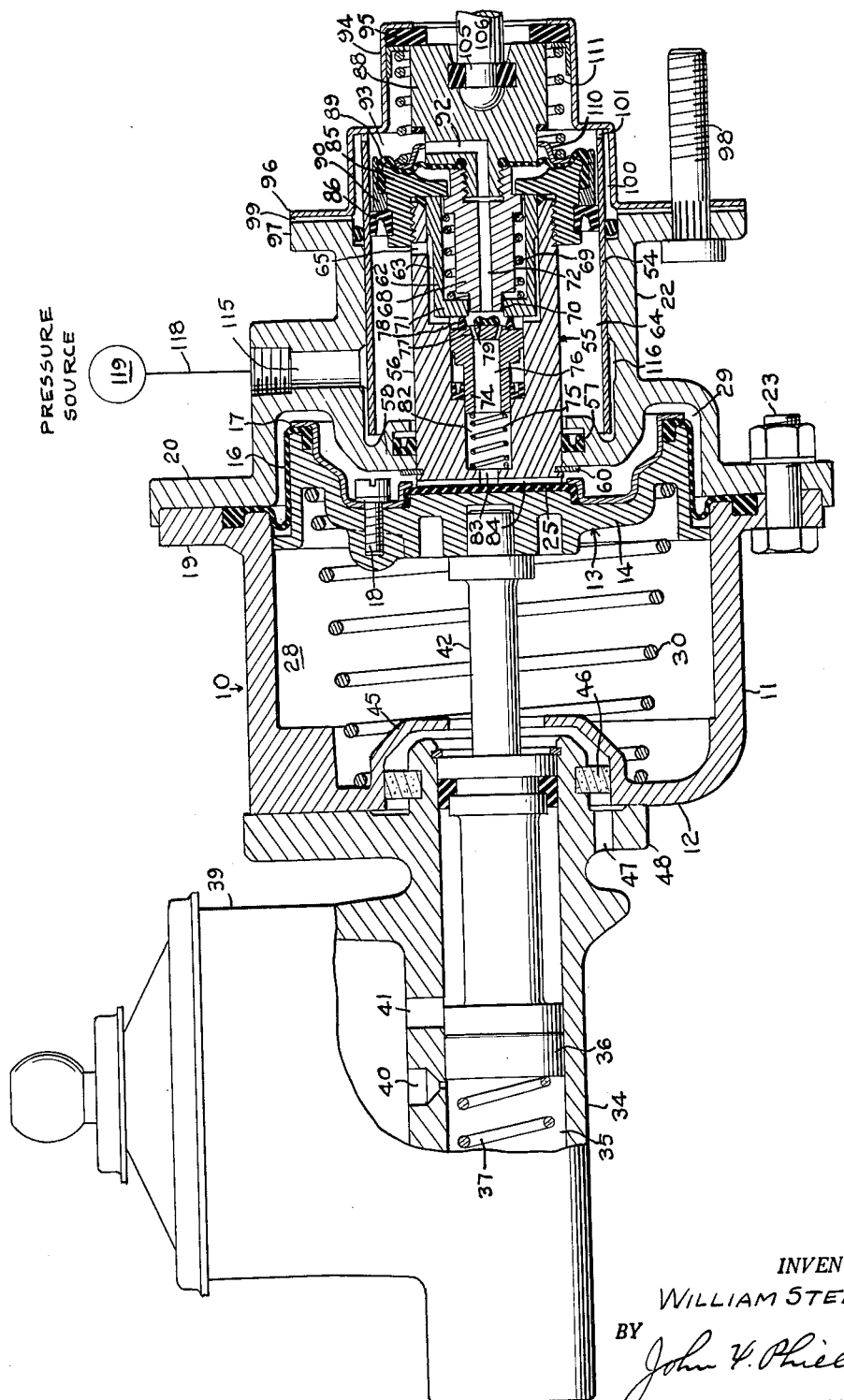
INVENTOR.
WILLIAM STELZER
BY John V. Phillips
ATTORNEY

United States Patent Office 3,093,119
Patented June 11, 1963

3,093,119
FLUID PRESSURE MOTOR
William Stelzer, Bloomfield Hills, Mich., assignor to Kelsey-Hayes Company, Romulus, Mich., a corporation of Delaware
Filed Oct. 30, 1961, Ser. No. 148,516
12 Claims. (Cl. 121—38)

This invention relates to a fluid pressure motor and is an improvement over the structures shown in the copending applications of David T. Ayers, Jr., Serial No. 137,397 filed September 4, 1961, and Edward Govan Hill and David T. Ayers, Jr., Serial No. 143,156 filed October 5, 1961.

In the application of David T. Ayers, Jr., Serial No. 137,397, referred to above, there is disclosed and claimed a novel type of motor mechanism for operating the brakes of a motor vehicle wherein the entire braking forces are developed by a fluid pressure motor controlled by a valve mechanism which is operated by a limited movement of the brake pedal, the pedal partaking of only sufficient movement to operate the valve mechanism without following through, as is the customary practice. Thus the operator is relieved of pushing the pedal substantial distances and the brake pedal is provided with reaction proportional to the degree of brake application so that the driver is always apprised of pressures being delivered to the brake cylinders.

In the structure shown in the copending application just referred to, a part of the valve mechanism is normally stationary but is capable of being moved by the brake pedal for the manual application of the brakes in the event of a failure in power in the source. It is possible, if substantial force is suddenly applied to the brake pedal, to move the structure which carries the normally stationary valve parts so as to apply pedal pressure to the brakes. The copending application of David T. Ayers, Jr., and Edward Govan Hill, Serial No. 143,156, referred to above provides a full power brake operating mechanism of the type referred to in which the structure carrying the normally stationary valve elements, and through which pedal forces are applied to the piston of the motor, is locked against movement except in the event of a failure of pressure in the source or when pressure delivered to the motor is substantially equal to pressure in the source, in which case the valve-carrying structure referred to is released for movement so that pedal-applied forces can be utilized directly to apply or assist in applying the brakes.

An important object of the present invention is to provide a brake operating mechanism of the character referred to having novel means for normally holding stationary the structure by which pedal forces are delivered for applying the brakes, without the use of any mechanical locking means.

A further object is to provide a mechanism which utilizes operating pressures delivered to the motor for normally holding stationary during a brake operation the structure referred to above.

A further object is to provide such a mechanism wherein the structure for delivering pedal forces directly for operating the vehicle brakes is formed as a piston subject to motor-operating pressures to hold such structure stationary and to release it for movement in the event of a failure in power in the motor.

A further object is to provide a valve structure with an internal reservoir in fixed communication with a pressure source and to utilize the pressure in such reservoir to normally maintain stationary the structure referred to above and to provide pressure in substantial volume which is delivered to the motor instantly upon operation of the valve mechanism to speed up the operation of the motor.

Other objects and advantages of the invention will become apparent during the course of the following description.

In the drawing I have shown one embodiment of the invention. In this showing—

The FIGURE is a fragmentary longitudinal sectional view through the pressure motor and associated parts, parts being broken away.

Referring to the drawing the numeral 10 designates as a whole a fluid pressure motor having a cylindrical casing 11 provided with a head 12 at one end. The casing 11 is provided therein with a pressure responsive unit 13 shown in the present instance as being a diaphragm piston. This piston comprises a preferably cast body 14 the periphery of which is freely slidable within the casing 11. A diaphragm 16 of the rolling type has its inner periphery fixed to the body 14 by a suitably shaped retaining plate 17 secured to the body 14 as at 18. The beaded outer periphery of the diaphragm 16 is clamped to a flange 19 formed on the casing, by a flange 20 formed on a housing 22. The flanges 19 and 20 are bolted together as at 23. The inner periphery of the plate 17 serves to maintain in position against the right-hand side of the body 14 a rubber bumper 25 for a purpose referred to below.

The pressure responsive unit 13 divides the motor 10 to form an atmospheric chamber 28 and a working chamber 29 to which fluid pressure is supplied in a manner to be described to move the unit 13 to the left. This unit is biased to the right to its off position by a return spring 30 and such movement of the pressure responsive unit 13 is limited in a manner to be described.

A master cylinder 34 is fixed to the head 12 in any suitable manner in axial alignment with the pressure responsive unit 13. The master cylinder 34 is provided with the usual pressure chamber 35 in which pressure is generated by operation of a plunger 36, biased to off position by a spring 37. Replenishing fluid is supplied from a conventional reservoir 39 through the usual ports 40 and 41. Hydraulic fluid under pressure flows from the chamber 35 through conventional lines (not shown) to the wheel cylinders of the vehicle.

A push rod 42 connects the piston body 14 to the plunger 36. The head 12 is provided with a flange 45 spaced from the adjacent end of the master cylinder body 34. Between such body and the flange 45 is arranged an air cleaner 46 communicating with the atmosphere through a port 47 in the attaching flange 48 of the master cylinder. Thus the motor chamber 28 is always in communication with the atmosphere.

The housing 22 is provided therein with a cylindrical sleeve 54 in which is slidable a structure indicated as a whole by the numeral 55 which performs two functions, namely, it serves as valve seat means for the motor control valves and as means for directly transmitting pedal pressures to the piston body 13, as further described below. The structure 55 comprises a body 56 having a cylindrical surface slidable through a seal 57 carried by a bearing wall 58 formed integral with the housing 22. The structure 55 occupies the normal position shown in the drawing and is limited in its movement to such position by a snap ring 60 carried by the body 56 and engageable with the bearing wall 58. In the normal positions of the parts, the bumper 25 engages the end of the body 56 to limit movement of the piston body 14 to normal off position.

A sleeve 62 has a driving fit in the right-hand end of the body 56, and the latter is provided with a bore forming with the sleeve 62, an annular fluid passage 63 communicating with a space 64 within the sleeve 54 and forming a pressure reservoir described below. The passage 63 communicates with the reservoir 64 through a port 65.

An axially movable member 68 is mounted within the sleeve 62 and is biased to the normal position shown by a spring 69. The member 68 has a reduced end slidable through an opening 70 in an end wall 71 formed integral with the sleeve 62 and forming a valve seat as described below. The member 68 is provided with an axial bore 72 extending therethrough. A valve member 74 is slidable in the body 56 and is baised to the right to its normal position by a spring 75. The valve member 74 is provided with an axial passage 76 communicating through passage 77 with the space within an annular resilient valve 78 bonded to the valve 74 and normally engaging the seat 71.

The right-hand end of the valve member 74 is provided with an axial valve element 79 adapted to seat against the adjacent end of the member 68 when the latter is moved to the left of its position shown in the drawing.

The spring 75 is arranged in a chamber 82 communicating at one end with the passage 76 and at its opposite end with a port 83. This port in turn communicates through radial grooves 84 formed in the adjacent end of the body 56, with the motor chamber 29.

A cap 85 is threaded on the right-hand end of the body 56 and serves as a stop for limiting movement of the member 68 to the right, as shown. The cap 85 carries an annular seal 86 slidable in the sleeve 54.

A pedal-operable member 88 has thread connection with the member 68 and clamps therebetween the inner periphery of a diaphragm 89, the outer periphery of such diaphragm being fixed to the cap 85 by a retainer 90. The member 88 is provided with passage means 92 communicating between the passage 72 and a chamber 93 formed within a stamped cover member 94.

The cover 94 houses a bumper 95 with which the member 88 is normally engaged. The cover member 94 has an annular flange 96 arranged against a flange 97 formed on the housing 22, and the two flanges 96 and 97 are secured to the vehicle fire wall (not shown) by bolts 98. The face of the flange 97 adjacent the flange 96 is radially grooved as at 99 to form atmospheric passages communicating with an annular passage 100 formed between the cover member 94 and the sleeve 54. The sleeve 54 has its right-hand end seated against the cover 94, and such end of the sleeve 54 is notched as at 101 to connect the chambers 93 and 100 to each other. Thus it will be apparent that the passage 92 is always in communication with the atmosphere.

The member 88 is connected as at 105 with a push rod 106 connected in any suitable manner wtih the vehicle brake pedal (not shown), and operation of the brake pedal moves the members 68 and 88 to the left to energize the motor 10 as described below.

A reaction plate 110 normally engages the outer portion of the diaphragm 89 with the cap 85 and is normally held in such position by a reaction spring 111, which is overcome under conditions to be described to transmit reaction forces to the brake pedal.

The device as shown in the drawings is primarily intended to be operated by superatmospheric pressure. To this end, the housing 22 is provided with a port 115 adapted for connection with such a source of pressure. The left-hand end of the sleeve 54 is spaced from the surrounding portion of the body 22 as at 116. The port 115 is connected as at 118 to a pressure source, diagrammatically indicated at 119. It will be noted that the left-hand end of the sleeve 54 is spaced from the adjacent portion of the bearing wall 58. Accordingly the chamber or reservoir 64 is always connected to the source of pressure around the left-hand end of the sleeve 54 and through the annular passage 116 and port 115.

*Operation*

The parts normally occupy the positions shown in the drawing, the pressure valve 78 being closed and the exhaust valve 79 open. Under such conditions, the motor chamber 29 communicates with the atmosphere through the various passages and chambers 83, 82, 76, 72, 92, 93, 100, and 99. Pressure in the motor chamber 28 being always at atmospheric pressure, where superatmospheric pressure is used as a source of power, pressures will be atmospherically balanced in the chambers 28 and 29.

When the brakes are to be applied, pedal movement imparted to the rod 106 will move the members 88 and 68 to the left. This movement closes the valve 79, thus closing the motor chamber 29 to the atmospheric passage 72. Slight further movement of the member 68 causes such members to move the valve body 74 to the left to unseat the valve 78. Pressure from the reservoir 64 will now flow through passages 65, 63, 77, and 76, and through chamber 82, port 83, and passages 84 into the motor chamber 29. Thus pressure will be applied to the chamber 29 to move the motor piston 13 to the left to operate the master cylinder plunger 36 and displace fluid into the wheel cylinders.

It is only necessary for the operator to impart through the member 68 the slight motion necessary to close the valve 79 and open the valve 78. Thus very little pedal movement is required for the full power operation of the brakes. No pedal forces normally are applied to the piston 13. This can be accomplished only by axial movement of the body 55, and under normal conditions pressure from the source always present in the chamber 64, acts against the seal 86 and the left-hand end of the cap 85 to maintain the parts referred to in their normal positions.

As soon as the valve 78 is cracked, pressure within the valve 78, acting to the left against the member 68, will slightly resist movement of the pedal. This pressure seeps past the reduced left end of the member 68 and into the space to the left of the diaphragm 89 to act against the shoulder of the member 88 against which the diaphragm 89 seats. During initial motor operation, there is relatively low resistance to the movement of the master cylinder piston 36 until the brake shoes engage the drums. During such initial operation therefore the piston 13 moves relatively easily to the left and the chamber 29 expands relatively rapidly. As soon as the brake shoes engage the drums, movement of the plunger 36 is resisted to reduce the speed of movement of the piston 13, hence, with the valve 78 even slightly cracked, pressure builds up rapidly in the chamber 29 to further energize the motor and raise the pressure of the fluid in the chamber 35.

During the initial operation referred to, the spring 111 maintains the diaphragm 89 seated against the cap 85. During the second stage of operation, when pressure is increased materially in the motor 29, there will be a corresponding pressure increase to the left of the diaphragm 89 to overcome the spring 111 and move the plate 110 to the right to its limit. The entire left-hand surface of the diaphragm will then become effective for resisting pedal movement, thus providing a second and higher stage of pedal reaction. Such reaction will always be proportional the pressure in the chamber 29 and thus to the degree of brake application.

The capacity of the reservoir is substantial and pressure therein performs two functions. In the first place it retains the structure 55 in normal position against movement by pedal pressure, and accordingly the motor 10 is wholly relied upon for solely the power operation of the brakes. In the second place, the volume of pressure fluid available in the chamber 64 serves to provide a fast initial response of the piston 13 to operation of the valves and permits the use of a smaller pressure supply line.

If pressure in the source should fail, or should drop materially due to leakage, movement of the brake pedal will transmit movement to the valve mechanism to supply to the motor chamber any pressure which might be available. Moreover, such movement of the pedal will take up the play between the valve seat wall 71 and the adjacent shoulder of the member 68, and accordingly brake pedal operation, carried out beyond its normal short stroke, will transmit forces from the structure 55 through the bumper 25 to the motor piston 13 to effect manual operation of the plunger 36, or to assist whatever pressure may be present in the chamber 29 in performing this operation.

When the brake pedal is released, the spring 69 returns the member 68 to normal position, opening the valve 79. The spring 75 returns the valve 74 to normal position, closing the pressure valve 78. The motor chamber 29 will again be connected to the atmosphere and the return spring 30 will return the piston 13 to normal position. In normal operation the structure 55 will not have moved, and when the piston 13 reaches its normal position, its movement will be stopped by engagement of the rubber bumper 25 with the end of the body 56. After an operation in which the structure 55 has been moved, in the event of a failure in pressure in the source or a reduction in such pressure, the spring 30 will return both the piston 13 and the structure 55 to normal position.

From the foregoing it will be apparent that the present construction provides for the full power operation of the brakes with very small normal pedal travel. It will be noted that without the use of any mechanical locking means, the structure 55 is prevented from moving by a source pressure in the reservoir 64. Moreover it will be apparent that the structure 55 is pedal operable to move the master cylinder plunger 36 for a full manual application of the brakes, or to assist pressure in the motor chamber 29 in performing this function if pressure in the source is substantially below its normal pressure.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A motor mechanism comprising a fluid pressure motor having a pressure responsive member provided with a pressure chamber at one side thereof, an axially movable structure engaging said pressure responsive member, a manually operable member, valve mechanism carried partly by said axially movable structure and partly by said manually operable member, said valve mechanism being operable for connecting said pressure chamber to a source of pressure to move said pressure responsive member, and means for utilizing pressure delivered to said pressure chamber to normally prevent movement of said axially movable structure upon operation of said valve mechanism whereby, upon a failure of such pressure, said manually operable member will move said axially movable structure to manually operate said pressure responsive member.

2. A motor mechanism comprising a fluid pressure motor having a pressure responsive member provided with a pressure chamber at one side thereof, an axially movable structure engaging said pressure responsive member, a manually operable member, valve mechanism carried partly by said axially movable structure and partly by said manually operable member, said valve mechanism being operable for connecting said pressure chamber to a source of pressure to move said pressure responsive member, and means adapted to connect said valve mechanism to a source of pressure, such means including a chamber, said axially movable structure having substantial pressure surfaces exposed to said last named chamber to normally prevent movement of said axially movable structure during operation of said valve mechanism unless such pressure should fail, whereupon movement of said manually operable member will move said axially movable structure to transmit manual force to said pressure responsive member.

3. A motor mechanism comprising a fluid pressure motor having a pressure responsive member provided with a pressure chamber at one side thereof, an axially movable structure engaging said pressure responsive member, a manually operable member having lost motion connection with said axially movable member, a source of pressure, a valve mechanism carried partly by said axially movable structure and partly by said manually operable member, said valve mechanism being operable within the limits of said lost motion connection for connecting said pressure chamber to said source to move said pressure responsive member, and means comprising substantial pressure surfaces carried by said axially movable structure for utilizing pressure in said source for maintaining said axially movable structure stationary when said valve mechanism is operated unless such pressure drops, whereupon said axially movable structure will be movable by said manually operable member to move said pressure responsive member.

4. A motor mechanism comprising a fluid pressure motor having a pressure responsive member provided with a pressure chamber at one side thereof, an axially movable structure engaging said pressure responsive member, a manually operable member having lost motion connection with said axially movable member, a source of pressure, a valve mechanism carried partly by said axially movable structure and partly by said manually operable member, said valve mechanism being operable within the limits of said lost motion connection for connecting said pressure chamber to said source to move said pressure responsive member, and a pressure reservoir communicating with said source, said axially movable structure having substantial pressure surfaces exposed to said reservoir to be maintained stationary by pressure therein when said valve mechanism is operated unless such pressure drops, whereupon said axially movable structure will be movable by said manually operable member to move said pressure responsive member.

5. A motor mechanism comprising a fluid pressure motor having a casing provided therein with a pressure responsive member, a housing fixed to said casing, said housing being provided adjacent said casing with a wall having an axial bearing, an axially movable structure slidable in said bearing and engaging said pressure responsive member, said wall, said casing and said pressure responsive member refining a pressure chamber, a manually operable member having lost motion connection with said axially movable member, a source of pressure, a valve mechanism carried partly by said axially movable structure and partly by said manually operable member, said valve mechanism being operable within the limits of said lost motion connection for connecting said pressure chamber to said source to move said pressure responsive member, and a pressure reservoir interposed between and communicating with said source and with said valve mechanism, said axially movable structure having substantial pressure surfaces exposed to said reservoir to be maintained stationary by pressure therein when said valve mechanism is operated unless such pressure drops, whereupon said axially movable structure will be movable by said manually operable member to move said pressure responsive member.

6. A motor mechanism according to claim 5 provided with a cylinder within said housing forming said reservoir, said axially movable structure having a portion slidable in said cylinder and provided with said pressure surfaces exposed to said reservoir.

7. A motor mechanism according to claim 5 provided with a cylindrical sleeve mounted in said housing coaxially with said bearing and forming said reservoir, said axially movable structure having an enlarged portion, including a peripheral seal slidable in said sleeve, forming said pressure surfaces exposed to said reservoir.

8. A motor mechanism according to claim 5 provided with pressure responsive reaction means subject to pressure admitted to said pressure chamber to oppose operation of said manually operable member to a degree proportional to energization of said motor when pressure is present in said source, said reaction means being inoperative when pressure in said source fails so as to offer no opposition to movement of said manually operable member when the latter is operated to transmit movement to said pressure responsive member.

9. A motor mechanism comprising a fluid pressure motor having a casing provided therein with a pressure responsive member, a housing fixed to said casing, said housing being provided adjacent said casing with a wall having an axial bearing, an axially movable structure slidable in said bearing and engaging said pressure responsive member, said wall, said casing and said pressure responsive member defining a pressure chamber, a manually operable member having lost motion connection with said axially movable member, a source of pressure, a valve mechanism comprising elements carried respectively by said axially movable structure and by said manually operable member, said valve mechanism being operable within the limits of said lost motion connection for connecting said pressure chamber to said source to move said pressure responsive member, one of said valve elements being carried by said axially movable member and being engageable with another of said elements and being provided with an atmospheric passage normally communicating with said pressure chamber, movement of said axially movable member causing said one valve element to engage said other valve element to close said atmospheric passage and open still another valve element to connect said source to said pressure chamber to move said pressure responsive member, and a sleeve forming therein a reservoir communicating with said source and with said valve mechanism, a portion of said axially movable structure being slidable in said sleeve in sealing engagement therewith and having portions at one side thereof exposed to said reservoir whereby pressure therein maintains said axial structure stationary when said valve mechanism is operated unless pressure in said source drops, whereupon said axially movable structure will be movable by said manually operable member to move said pressure responsive member, said atmospheric passage opening to the atmosphere at the other side of said portion of said axially movable structure.

10. A motor mechanism according to claim 9 wherein said sleeve is an insert in said housing and has one end terminating spaced from said wall, said housing having a pressure port communicating around said end of said sleeve with said reservoir.

11. A motor mechanism according to claim 9 provided with a pressure responsive reaction member engageable with said manually operable member under pressure admitted to said motor when said valve mechanism is operated, to oppose movement of said manually operable member proportional to pressure in said motor, said reaction means being inoperative upon a failure of pressure in said source so as not to interfere with operation of said manually operable member when the latter is moved to transmit force to said pressure responsive member.

12. A motor mechanism comprising a fluid pressure motor having a pressure responsive member provided with a pressure chamber at one side thereof, an axially movable structure engaging said pressure responsive member, a manually operable member, valve mechanism carried partly by said axially movable structure and partly by said manually operable member, said valve mechanism being operable for connecting said pressure chamber to a source of pressure to move said pressure responsive member, means for utilizing pressure delivered to said pressure chamber to normally prevent movement of said axially movable structure upon operation of said valve mechanism whereby, upon a failure of such pressure, said manually operable member will move said axially movable structure to manually operate said pressure responsive member, and reaction means exposed to pressure delivered to said motor mechanism and engageable with said manually operable member to oppose movement thereof proportional to pressure delivered to said pressure chamber.

References Cited in the file of this patent
UNITED STATES PATENTS

| 2,745,383 | Hupp | May 15, 1956 |
| 2,761,427 | Shumaker | Sept. 4, 1956 |
| 2,779,314 | Vorech | Jan. 29, 1957 |
| 2,997,028 | Ayers | Aug. 22, 1961 |